Patented Jan. 26, 1937

2,068,910

UNITED STATES PATENT OFFICE 2,068,910

PROCESS FOR CANNING OATMEAL PORRIDGE

Elizabeth C. Forbes, Fallston, Md.

No Drawing. Application December 21, 1935, Serial No. 55,679

2 Claims. (Cl. 99—182)

This invention relates in general to the canning of cooked cereals of glutinous nature and particularly to the canning, in tins, of wheat or oatmeal porridge.

It is old in the art to can non-glutinous materials such, for example, as hominy, but a number of peculiar problems complicate the process of canning cooked wheat or oatmeal, for instance, the fact that it cannot be cooked in situ in the can like hominy on account of lumping, but must have at least the initial stage of its cooking done in a separate vessel under agitation. Another problem relates to the tendency of the porridge under certain conditions of processing to exhale a decidedly unpleasant odor when the can is first opened which, of course, militates against the success of the product. A further difficulty is to overcome the discoloration of the surface of the tin above the mass of porridge, which discoloration sometimes spreads to the margin of the mass and to such detached particles of porridge as may be adherent to the tin.

The present invention has for its object a process for canning porridge of the class described, which is free from the above objectionable features, and produces a product which is smoother, better cooked and of fuller flavor than is porridge processed in any other manner.

In carrying out my process, with oatmeal for example, the oatmeal is subjected to a preliminary cooking period in an open kettle or alternatively in a steam cooker under some pressure. In either instance, the cooking is done under conditions of active boiling and constant stirring either by hand or by means of some form of mechanical agitation. Pressure and duration of the cooking period are not critical for this stage of the process, the cooking being continued until the grains have swelled and the starch is soft.

Then, without substantial lowering of the temperature of the mass, the oatmeal is run into cans and sealed. It is then subjected to the second cooking stage or processing. The processing must be done under pressure, the range being from 2 to 10 pounds, the upper limit of this range being quite critical for if it is processed at a higher pressure than 10 pounds, a can of the finished product when first opened emits a decidedly unpleasant or unwholesome odor, the nature of which is not fully understood, but presumably results from some breaking down in the organic structure of the oatmeal due to the high boiling point which accompanies high pressure. At pressures below 10 pounds, this odor is not present.

The process of my invention is applicable to two styles of oats, the rolled oats in which the grain is fully mashed and disintegrated and readily permeable by the heat and water, and steel cut oats in which the grain particles are coarser and therefore less permeable. Processing under pressure therefore takes a variable time, depending upon the pressure and also upon the nature of the oats. For example, under 7 pounds pressure which corresponds to a boiling point of 230 degrees F., processing requires sixty minutes for rolled oats and eighty minutes for the steel cut oats.

After the conclusion of the processing step, the sealed cans are subjected to controlled cooling. This cooling must be very slow. Oatmeal porridge in common with other substances such as chocolate, sugar, etc., is subjected to being "shocked" by sudden temperature changes by which is meant that it may undergo a decided change in physical condition when suddenly reduced in temperature. In the cooling step which concludes ordinary methods of processing, the cans are lifted from the processing boiler in a suitable basket and plunged into cold water, being immediately thus cooled down to room temperature or lower. This will not do however for cereal porridge for it has been found that when the cooked porridge is suddenly cooled after processing in the manner set forth, the tin on the inside of the can above the oatmeal mass instead of remaining bright, blackens, apparently through oxidation, and that if detached particles of porridge become stuck to the inside lid of the can they are very noticeably surrounded by blackened spots on the tin. This condition gives the suspicion that the porridge is not sound and impairs the saleability of the product. By slow cooling, this untoward phenomenon does not take place. Any suitable apparatus may be employed for the cooling and the construction of such apparatus does not in any way affect the patentability of the process. For example, the basket in which the cans are processed may be plunged into a kettle of water, the temperature of which is preferably at around 80° F. The cans, it will be recalled, are at about 230° F. so that they immediately raise the temperature of the surrounding water in the kettle to the boiling point. Cold water is then admitted gradually to the heated water which surrounds the cans and they are slowly brought down to a temperature of between 60 and 70 degrees F., or what would be ordinarily termed room temperature.

It usually takes about thirty minutes thus to cool the product.

While I have in the above description disclosed what I believe to be a preferred and practical embodiment of my invention, it will be understood to those skilled in the art that the technique of the process is subject to some variation and that the specific details as described are not to be construed as limiting the scope of the invention as claimed.

What I claim is:

1. Process for canning oatmeal porridge comprising boiling the oatmeal in water in mass with agitation until danger of lumping is past, transferring the mass to cans without substantial lowering of temperature, sealing the cans, processing the sealed product by boiling at a temperature above the boiling point of water but not above 230 degrees F. until thoroughly cooked, and slowly cooling the product down to room temperature through a time period approximating thirty minutes.

2. Process for canning oatmeal porridge comprising boiling the oatmeal in water in mass with continuous agitation until danger of lumping is past, transferring the mass to cans without substantial lowering of temperature, sealing the cans, processing the sealed product in the cans by subjecting them to heating at a temperature above the boiling point of water and not above 230 degrees F. for a period of time within a range of from sixty to eighty minutes until thoroughly cooked, and slowly cooling the product down to room temperature through a time period approximating thirty minutes.

ELIZABETH C. FORBES.